United States Patent
Bonnet

(10) Patent No.: US 8,258,643 B2
(45) Date of Patent: Sep. 4, 2012

(54) METHOD AND SYSTEM FOR CONTROL OF WIND TURBINES

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/270,441

(22) Filed: Oct. 11, 2011

(65) Prior Publication Data

US 2012/0139244 A1  Jun. 7, 2012

(51) Int. Cl.
*F03D 9/00* (2006.01)
(52) U.S. Cl. .......................................... 290/44; 290/55
(58) Field of Classification Search .............. 290/43, 290/44, 54, 55; 322/37
See application file for complete search history.

(56) References Cited

U.S. PATENT DOCUMENTS

| | | | | |
|---|---|---|---|---|
| 6,320,272 | B1 * | 11/2001 | Lading et al. | 290/44 |
| 6,909,198 | B2 * | 6/2005 | Ragwitz et al. | 290/44 |
| 7,352,075 | B2 * | 4/2008 | Willey et al. | 290/44 |
| 7,420,289 | B2 * | 9/2008 | Wang et al. | 290/44 |
| 7,525,209 | B2 * | 4/2009 | Kabatzke et al. | 290/44 |
| 7,528,496 | B2 * | 5/2009 | Fortmann | 290/44 |
| 7,629,702 | B2 * | 12/2009 | Schubert | 290/44 |
| 7,952,216 | B2 * | 5/2011 | Kikuchi et al. | 290/44 |

* cited by examiner

*Primary Examiner* — Nicholas Ponomarenko
(74) *Attorney, Agent, or Firm* — Global Patent Operation; Douglas D. Zhang

(57) ABSTRACT

A method of controlling at least one wind turbine, comprising selecting a first effective operational curve from a plurality of operational curves, and applying the first effective operational curve to control at least one wind turbine. The operational curves may be operational curve segments.

20 Claims, 7 Drawing Sheets

METHOD AND SYSTEM FOR CONTROL OF WIND TURBINES

BACKGROUND OF THE INVENTION

The subject matter described herein relates generally to methods and systems for performance control of wind turbines and wind parks, and more particularly, to methods and systems for programming, and in some embodiments providing user control of, the performance of wind turbines and/or wind parks.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

Wind turbines often are equipped with measurement and control systems that enable them to measure output for example power and noise, and to react to changing conditions such as wind speed and direction.

The control settings of wind turbines, as well as environmental variables such as wind speed, significantly impact the power and noise characteristics of wind turbines. Usually, the operation of a wind is characterized by a power curve and a corresponding noise emission curve.

Due to the variability of wind, operational constraints such as the maximal electrical power produced by wind turbines is subject to variation on several different time scales, ranging from hourly changes in wind speed and direction or more often, to diurnal changes, to seasonal changes occurring on the time scale of months, to annual fluctuations of average wind speed. The variability of wind conditions presents substantial challenges to the efficient design and operation of wind turbines, such as limiting the possible electrical power output of a given wind turbine or existing windpark configuration. Due to the variability of wind direction, wake effects that occur when a second wind turbine is located downstream of another also variably impact the maximal electrical power output.

Operational targets such as hard noise limits or legal regulations pertaining to noise emission also sometimes impact the performance of wind turbines and/or wind parks. A trade-off between energy capture (annual energy production in MWh) and corresponding noise emission exists. Usually, more efficient wind energy capture is associated with greater noise emission. On the other hand, low or poor energy capture reduces the economic viability of a wind turbine or wind park. The maximal energy capturing capabilities of wind turbines and wind parks may be highly influenced by local noise limits.

BRIEF DESCRIPTION OF THE INVENTION

According to one aspect, a method of controlling at least one wind turbine includes providing a plurality of operational curves, determining a first condition, comparing the first condition to a target to form a comparison, selecting a first effective operational curve from a plurality of operational curves, wherein selecting the first effective operational curve is based on the comparison, and applying the first effective operational curve to control at least one wind turbine.

According to another aspect, a method of controlling at least one wind turbine includes providing a plurality of operational curve segments, form a plurality of hybrid operational curves by combining operational curve segments from the plurality of operational curve segments, selecting a first effective operational curve from the plurality of hybrid operational curves, and applying the first effective operational curve to control at least one wind turbine.

In yet another aspect, a control system for controlling at least one wind turbine includes a controller, and a memory for storing a plurality of operational curve segments, wherein the controller is adapted to select a first effective operational curve segment from the plurality of operational curve segments, and is adapted to apply the first effective operational curve segment to the control of at least one wind turbine.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
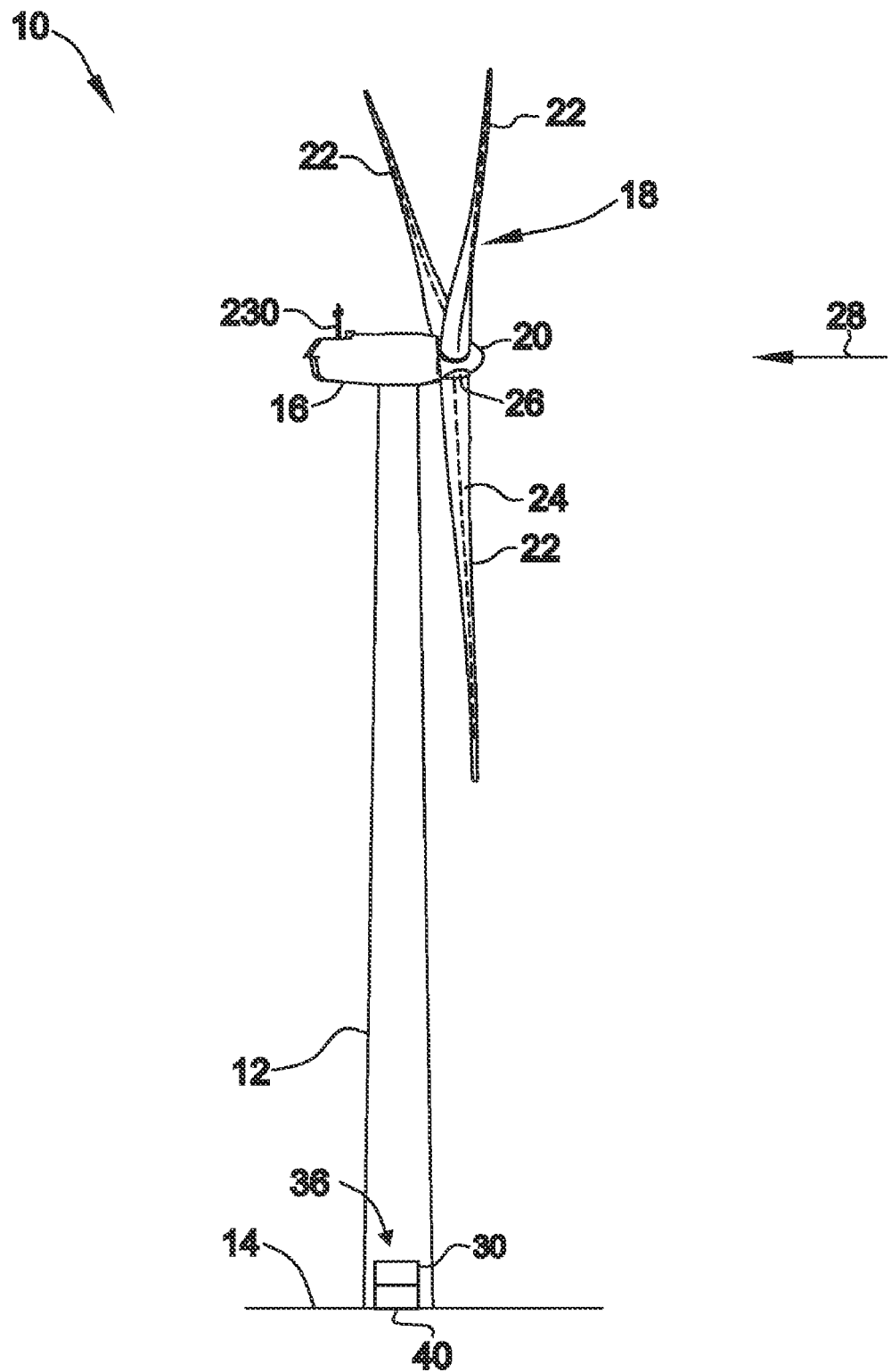
FIG. 1 is a perspective view of an exemplary wind turbine, according to embodiments described herein.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "condition" is intended to be representative of a variable that is determined, communicated to, calculated by, or measured by a wind turbine controller. Several examples of conditions, by way of example, not limitation, are: wind speed, noise, power, time, rotor speed, generator performance, pitch angle, pitch rate, wind velocity, wind direction, wind speed gradient, air density, air density gradient, seasonal wind rose, seasonal wind speed, seasonal spatial distribution of wind, yearly windrose, yearly wind speed, yearly spatial distribution of wind, and temperature. Conditions may be calculated based on measured conditions. For example, using a plurality of anemometers that each measure windspeed at a plurality of locations, a wind speed gradient may be calculated. The term "conditions," herein, may refer to measured conditions, calculated conditions, and settings. A condition may be controllable or not controllable. For example a wind speed is not directly controllable, although wind turbine settings of one wind turbine at one location may impact wind speeds at positions on the lee side of the one wind turbine. For example, pitch angle is at least partially controllable.

As used herein, the term "wind park development simulations" is intended to be representative of results of computer simulations that estimate operational outputs of wind parks such as, by way of example, not limitation, annual energy production and average noise output based on available data. Available data in this regard refers to, by way of example, not limitation: real, planned, or hypothetical spatial distributions of wind turbines, wind turbine type and performance characteristics, annual wind rose, and local hard noise limits.

As used herein, operations performed "by the controller" can include operations performed with or without user input. Operations performed by the controller can refer to operations performed as part of an algorithm that runs without user input, or operations performed by the controller in response to user input.

As used herein, "operation settings" (or "operational settings") are intended to be representative of settings that are adjusted to control the operation of a wind turbine, for example but not limited by pitch and load. As used herein, the term "settings" and "setting" are intended to be representative of wind turbine operational parameters that are at least partially controllable. By way of example, not limitation, the pitch angle of rotor blades is a setting. By way of example, not limitation, the performance of a wind turbine is controlled by its setting; and setting in this example may refer to more than one setting, for example, pitch angle and load.

As used herein, "operational curves" or "operation curves" are intended to be representative of actual, expected, theoretical, or modeled wind turbine outputs in relation to their dependence on a variable, for example wind speed or tip speed ratio. For example but not limitation, a power curve is an operational curve that is representative of power's dependence on wind speed. Another example is a noise curve that is representative of noise's dependence on wind speed. Operational curves may be defined for variable ranges of conditions. Thus, operational curves may be operational curve segments. Operational curves may be, by way of example and not limitation, effective operational curves, operational curve segments, group effective operational curves, and hybrid operational curves. Herein, wind speed is an exemplary variable on which operational curves are dependent, although wind speed is exemplary and not limiting; operational curves may also be dependent on other variables.

As used herein, "operational curve segment" is intended to be representative of an operational curve that is defined over a range of conditions, for example wind speed. For example, two operational curve segments, each optionally associated with different operational settings, may be combined to form a third operational curve. The third operational curve is similar to the first operational curve segment over a first range of wind speeds, and is similar to the second operational curve segment over a second range of wind speeds. The operational curve segments may have defined outputs over overlapping ranges of conditions. For example, a first operational curve segment may be defined for wind speeds of 0 to 5 m/s, and a second operational curve segment may be defined for wind speeds of 4 to 10 m/s.

As used herein, "effective operational curve" is intended to be representative of an operational curve which may be associated with operational settings. The effective operational curve is applied to the operation of at least one wind tubine. As used herein, "group effective operational curve," is an operational curve that is applied to the operation of a group of wind tubines.

As used herein, the term "wind turbine group configuration," is intended to be representative of an assigned plurality of group effective operational curves, each assigned effective operational curve assigned to at least one group of wind turbines.

As used herein, the term, "wind park configuration" is intended to be representative of how wind turbines are assigned to groups. For example, given 3 wind turbines, each with labels of A, B, and C, respectively; one wind park configuration may be with the wind turbines A and B in group 1, and wind turbine C in group 2. Alternatively or additionally, a second wind park configuration may be with the wind turbines A and C in group 1, and wind turbine B in group 2.

As used herein, "wind turbine topology" is intended to be representative of a spatial map of the positions of wind turbines, including elevation, thus for example, a 3-dimensional map of positions of wind turbines in a wind park is a description of wind turbine topology.

As used herein, "targets" or "limits" are representative of values of parameters or variables, often toward which comparisons are made. For example, a comparison may be made between a condition and a target to form a comparison. For example, when wind speed increases above a target of 10 m/s, adjustments are made to its operational settings (i.e. a windspeed of 10 m/s is a target). In another example, operational settings are adjusted incrementally until a noise output becomes equal to a hard noise limit (i.e. the hard noise limit is a target).

As used herein, "comparisons," for example those formed by comparing a target to a condition, are representative of Boolean values, differences, quotients, percent differences, percent errors, absolute errors, and the like.

As used herein, the term, "wind turbine group configuration" is representative of a result of applying a plurality of effective group operational curves to a plurality of wind turbines. It differs from wind park configuration in that the wind turbines remain assigned to the same groups, but different effective group settings are applied to the groups. In the configuration of a wind park, the wind turbines may be assigned to different groups.

As used herein, the term, "dynamic control" is representative of applying operational curves to control at least one wind turbine based on time. As used herein, the term, "dynamic control" may also be representative of adjusting the operation of at least one wind turbine in response to time. The dynamic control may be cyclical, for example but not limitation, based on a daily cycle or yearly cycle.

As used herein, the term, "dynamic control map" or "dynamic control map overlay" is representative of applying operational curves to at least one wind turbine, based on time. In one example, a dynamic control map comprises a clock, and is used to control the operation of a single wind turbine by selecting one wind turbine setting for the daytime, and another wind turbine setting for the nighttime. In another example, a dynamic control map is applied to the operation of a wind park that consists of two groups of wind turbines; the operation of the wind turbines is adjusted according to four operational curves; two are in effect at nighttime and two are in effect during the daytime; of the daytime operational curves, one is applied to the first group and the other to the second group; of the nighttime operational curves, one is applied to the first group and the other to the second group.

As used herein, "noise limits," for example "hard noise limits" is representative of: one maximum desirable or allowable level of noise at one location, or more than one maximum desirable or allowable level of noise at multiple locations. A noise limit or hard noise limit may or may not be due to legal requirements, and may change dynamicall, for example having nighttime limits and daytime limits.

As used herein, the term, "maximize power output," is representative of having the effect of increasing or maintaining a power output. The process of maximizing power output may be iterative, and may include steps that actually reduce power output temporarily or even permanently. As used herein, "maximizing," may be an iterative action, and may include steps that at least temporarily reduce rather than increase. In an example, maximizing a power output may be regarded as complete when power and noise output are both simultaneously increased so that noise output is equal to a noise limit or noise target. In another example, maximizing a power output may be regarded as complete when power and noise output are both simultaneously reduced so that noise output is just less than a target.

As used herein, the term, "estimate of energy output" is representative of an action or result of an action related to estimating energy output. Non-limiting examples follow: an estimate of annual energy production may be an estimate of energy output; instantaneous power output may be an estimate of energy output; time-averaged power output may be an estimate of energy output; an estimate of energy capture may be an estimate of energy output; estimated gain of annual energy production may be an estimate of energy output; quantities calculated from captured energy and conditions, including time-averaged conditions, may also be estimates of energy outputs.

As used herein, the term, "sensor" is representative of apparatuses used to determine or measure conditions. For example, not limitation, a sensor may be an anemometer, thermometer, pressure sensor, meteorological sensor, or tachometer. Additionally or alternatively, a plurality of sensors may determine multiple conditions at multiple locations. Herein, conditions may be determined by sensors.

As used herein, operations and/or actions and/or steps and/or functions that are performed by a controller and/or a control system and/or any component thereof, for example but not limitation a sensor and/or a memory, are performed by the controller or control system adapted to perform the operations and/or actions and/or steps and/or functions. For example but not limitation, by describing herein that the controller selects an effective operational curve, it is also conveyed also that the controller is adapted to select an effective operational curve. For another non-limiting example, by describing a sensor that determines a first condition, it is conveyed also that a sensor is adapted to determine a first condition.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height. In the exemplary embodiment, a sensor 230 is located on the nacelle 16. Alternatively or additionally, a sensor may be located in the tower 12, on the support system 14, or elsewhere.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

In the exemplary embodiment, the controller 36 is shown on the support system 14, however, the controller 36 may be a distributed system throughout wind turbine 10, within nacelle 16, within a wind farm, and/or at a remote control center. Controller 36 includes a processor 40 configured to perform the methods and/or steps described herein, and a memory 30. Further, many of the other components described herein include a processor. As used herein, the term "processor" is not limited to integrated circuits referred to in the art as a computer, but broadly refers to a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
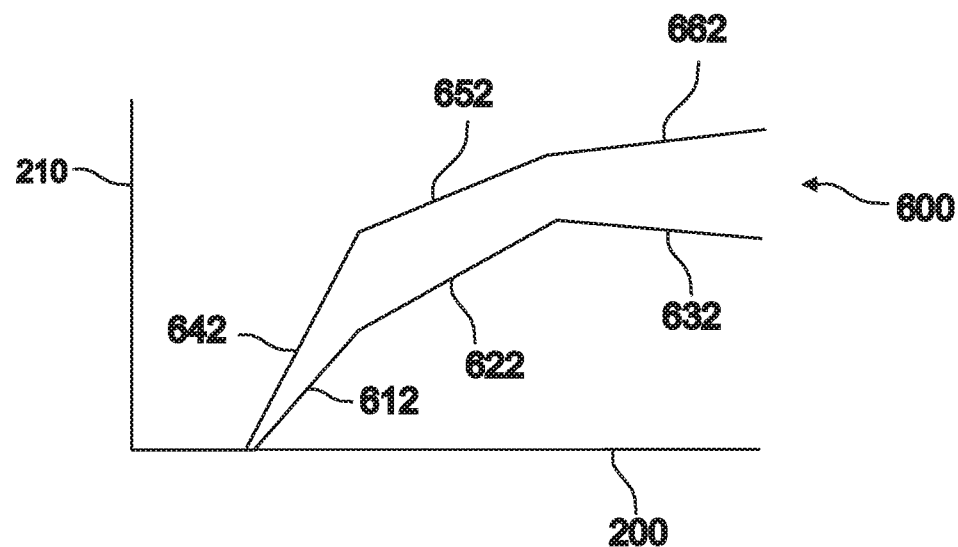
FIG. 2 is an enlarged sectional view of a portion of the wind turbine shown in FIG. 1, according to embodiments described herein.

FIG. 2 shows operational curve segments 600, which describe an output on the vertical axis 210 versus wind speed on the horizontal axis 200. For example the output is power or sound. Sound may be regarded as noise. As examples, FIG. 2 shows: a low-speed low-output curve segment 612, a low-speed high-output curve segment 642, a medium-speed low-output curve segment 622, a medium-speed high-output curve segment 652, a high-speed low-output curve segment 632, and a high-speed high-output curve segment 662. Other operational curves are possible. For example in the high speed range, between the high-speed curve segments 632 and 662, there can exist several additional curve segments that describe varying levels of output, for example over a same or similar range of windspeeds. For example in the medium speed range, between the medium-speed curve segments 622 and 652, there can exist several additional curves that describe varying levels of output at medium speeds. For example in the low speed range, between the low-speed curve segments 612 and 642, there can exist several additional curves that describe varying levels of output at low speeds. In an embodiment, there exists a plurality of low-range operational curve segments defined for a low range of wind speeds, a plurality of mid-range operational curve segments defined for a medium range of wind speeds, and a plurality of high-range operational curve segments defined for high wind speeds.

Figure 3:
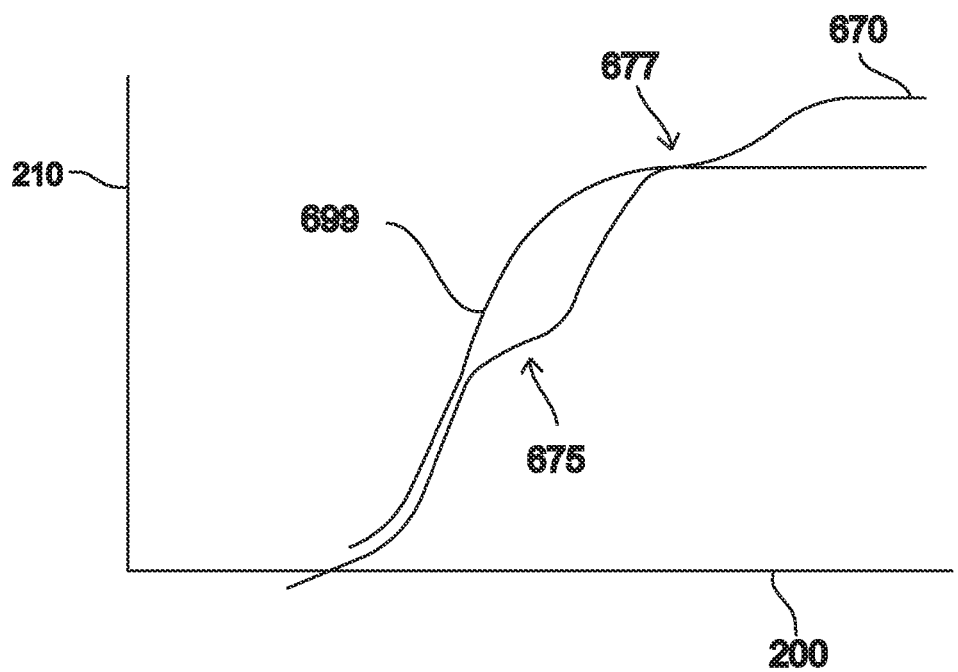
FIG. 3 is a graph of a standard operational curve and a hybrid operational curve, according to embodiments described herein.

In an embodiment, a hybrid operational curve 670, shown in FIG. 3, is formed by combining operational curve segments as they are shown FIG. 2. For example, the low-speed high-output curve 642, medium-speed low-output curve 622, and high-speed high-output curve 662 are combined to form a hybrid operational curve 670; with high, medium and low speeds referring to ranges of wind speeds.

The hybrid operational curve 670 has smooth transitions between component operational curve segments (e.g. from low to medium speed regimes, and from medium to high speed regimes; in this example at the intersection of output curves 642 and 622, and at the intersection of output curves 622 and 662, respectively) as a result of set points assignment, controller operation time constant, and hysteresis from wind turbine operations. FIG. 3 shows smooth transitions between operational curve segments, such as the low to medium windspeed transition region 675, and the medium to high windspeed transition region 677; which are a result of set points assignments, controller operation time constant, and expected hysteresis from wind turbine operations.

A standard operational curve 699 and a hybrid operational curve 670 that is formed by combining more than one, e.g. three, operational curve segments are shown in FIG. 3. The hybrid operational curve 670 exhibits, in comparison to the standard operational curve 699: low output reduction at low windspeed, high output reduction at medium wind speed, and increasing output as wind speed increases further above already comparatively high speeds. The operation of the at least one wind turbine is adjusted based on at least partially the hybrid operational curve 670.

For example, conditions may exist for which it is desirable or required to have a wind turbine setting that meets the following targets: at low wind speed, there is low reduction of output in comparison to the standard output curve; at medium wind speed, there is significantly less output in comparison to the standard output curve; and at high wind speed, there is more output in comparison to the standard output curve. The hybrid operational curve 670 of FIG. 3 meets the targets, and the operation of at least one wind turbine is adjusted based on at least partially the hybrid operational curve.

In another example, the operation of at least one wind turbine is adjusted based on at least partially the hybrid operational curve 670 of FIG. 3, which results in low noise reduction at low windspeed, high noise reduction at medium wind speed, and increasing noise as wind speed increases further above already comparatively high speeds, all in comparison to the standard operational curve 699. Power output follows the same trends as does the noise output, with little power reduction at low windspeed, substantially reduced power output at medium windspeeds, and increasing power output as windspeed increases at already relatively high windspeeds, all in comparison to the standard operational curve 699.

An advantage of applying a hybrid operational curve toward the operation of at least one wind turbine is that it provides more flexibility in controlling wind turbine output, for example as conditions such as wind speed change. An advantage of the use of hybrid operational curve is that the operation of a wind turbine may be flexibly adjusted to be, for example, maximally efficient in terms of capturing energy, while maintaining noise output below hard noise limits. By applying hybrid operational curves toward the operation of multiple wind turbines, wake loss effects can be reduced or minimized.

Although noise and power output curves follow the same trends, it is also possible that a range of possible noise curves exists for one power curve. To an extent, noise and power curves can be chosen fully or partially independently. Thus, for example, the operation of a wind turbine is adjusted according to a hybrid power operational curve and a hybrid noise curve that maximize energy capture while maintaining noise output below acceptable limits.

In an embodiment, a plurality of hybrid settings are formed by combining the settings associated with operational curve segments. For example, a hybrid setting is formed by the settings associated with the low-speed high-output curve 642, medium-speed low-output curve 622, and high-speed high-output curve 662.

In an embodiment, a plurality of hybrid settings is formed by combining settings from a plurality of settings. For example, many low-range settings are defined for low wind speeds; many mid-range settings are defined for medium wind speeds; and many high-range settings are defined for high wind speeds. One low-range setting, one mid-range setting, and one high-range setting are combined to form a first hybrid setting. Furthermore, a plurality of hybrid settings may be formed. Each hybrid setting is formed by combining any one of the low-range settings with any one of the high-range settings; optionally, each hybrid setting is combined also with a mid-range setting. Hybrid operational curves may be associated with each of the hybrid settings, for example a hybrid setting is associated with the hybrid operational curve 670 shown in FIG. 3.

Figure 4:
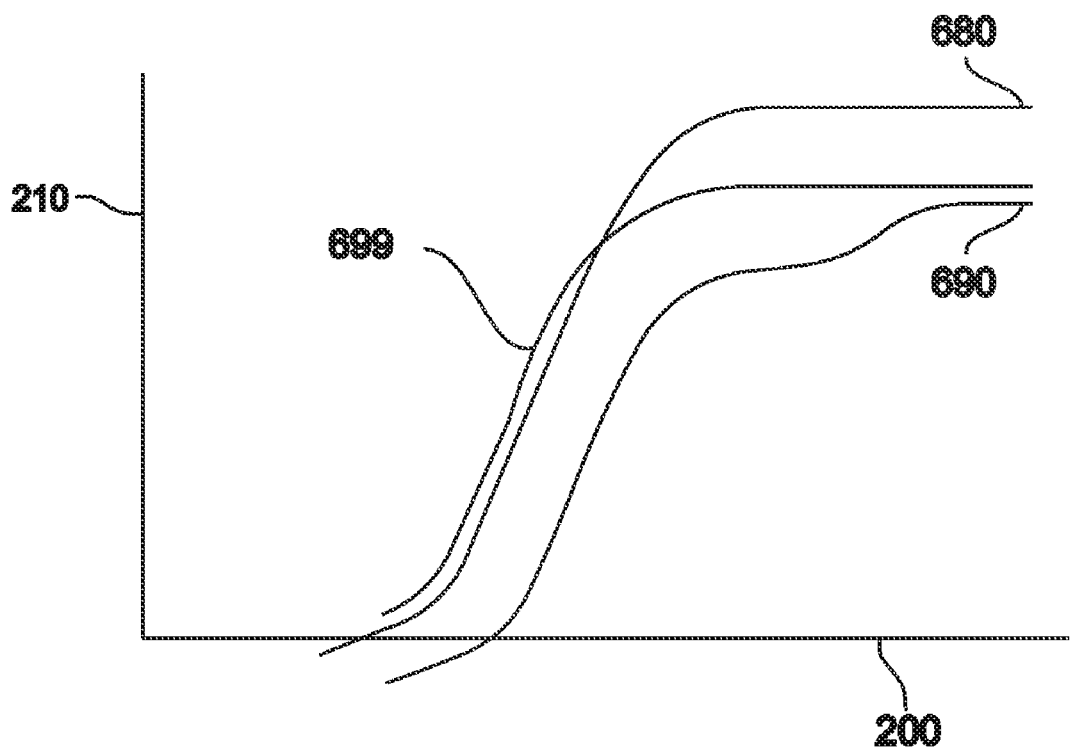
FIG. 4 is a graph of a standard operational curve and two hybrid operational curves, according to embodiments described herein.

FIG. 4 depicts the standard operational curve 699, a first hybrid operational curve 680 and a second hybrid operational curve 690. In an embodiment, an effective operational curve is selected from a plurality of hybrid operational curves. For example the selection of an effective operational curve from a plurality of hybrid operational curves is based on at least one condition, for example, time. In a further example, dynamic changes to effective operational curves are possible, calculated based on, at least partially, detected and/or expected changes in conditions, for example daily changes in wind speed. The time scale of changes in conditions varies from hours or more rapidly, to slower time scales, for example, annually.

In another example, daytime operation requires or makes desirable (in comparison to the standard operational curve 699): at low wind speed, little reduction of noise; at medium wind speed, higher noise is possible; and at high wind speed, even higher acoustic targets are acceptable, leading to higher possible power output. The first hybrid operational curve 680 of FIG. 4 meets the daytime operational targets, and is formed by combining operational curve segments 642, 652, and 662. Nighttime operation requires or makes desirable: at low to medium wind speed, high noise reduction; and at high wind speed, progressively more power as wind speed increases and higher acoustic targets become more acceptable. The second hybrid operational curve 690 of FIG. 4 satisfies the nighttime operational targets, and is formed by combining operational curve segments 612, 622, and 662. Each of the hybrid operational curves 680 and 690 show smooth transitions between the operational curve segments that are combined to form the hybrid operational curves.

In another example, the first hybrid operational curve 680 of FIG. 4 is selected for a seasonal period, for example a summer with a very low wind speed. In yet another example, the first hybrid operational curve 680 of FIG. 4 is selected for a year in which time-integrated average wind speed is much lower than the reference average wind speed. In yet another example, the second hybrid operational curve 690 of FIG. 4 is selected for a high wind speed winter. In yet another example, the second hybrid operational curve 690 of FIG. 4 is selected for a year in which time-integrated average wind speed is much higher than reference average wind speed.

An advantage of dynamic selection of hybrid operational curves toward the operation of at least one wind turbine is that it provides more flexibility in controlling wind turbine output, for example as conditions such as wind speed and/or hard noise limits change. For example, as daily/nightly noise requirements, limits, or targets change and wind speed changes, the selection of different operational curves may allow increased or maximal energy capture while maintaining noise output at just below a target such as a local hard noise limit. By dynamically selecting hybrid operational curves to operate multiple wind turbines, wake loss effects can be reduced or minimized, for example in response to varying wind conditions.

In an embodiment, a single or multiple hybrid operational curves is (are) selected as effective operational curve(s) and applied to control at least one turbine. A single effective operational curve may be applied to control a single wind turbine or multiple wind turbines. Multiple effective operational curves may be selected and applied to the operation of multiple wind turbines nearly or exactly simultaneously, and each effective operational curve that is selected may control one or more wind turbines.

In an embodiment, an effective setting is selected from a plurality of hybrid settings, and applied to the operation of at least one wind turbine.

Figure 5:
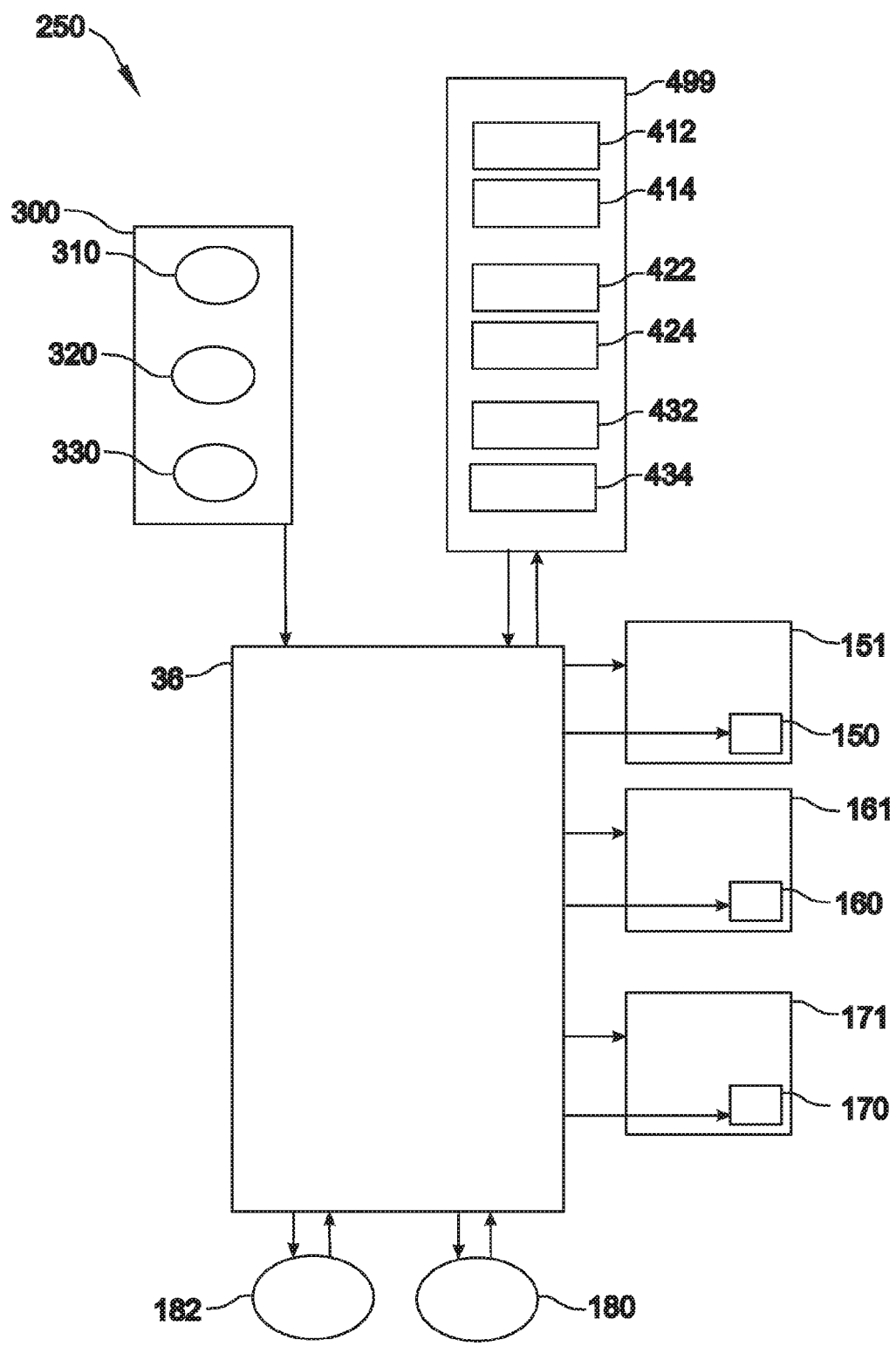
FIG. 5 is a schematic diagram of a control system, according to embodiments described herein.

FIG. 5 illustrates an embodiment of a control system. Conditions 300 are received by and/or optionally calculated by the controller 36. Based on conditions, effective operational curves 150, 160, 170 are selected from the operational curve segments 499 and applied to the operation of wind turbines; alternatively or additionally, group effective operational curves 151, 161, 171 are selected from operational curve segments 499, and applied to the operation of groups of wind turbines. Group configurations 180 are read from and/or written to memory, and wind park configurations 182 are read from and/or written to memory.

In an embodiment, effective operational curves 150, 160, 170 may be effective operational curve segments.

In an embodiment, a first condition 310 is compared to a target 260 to form comparison 270. Based on the comparison, the effective operational curve is selected. The target may be written to and/or read from memory. The comparison may be written to and/or read from memory.

In an embodiment, the controller 36 receives a first condition 310, for example a wind speed, as an input. Based on the value of the first condition 310, a first operational curve segment, for example a first power curve segment 412, is selected from the plurality of operational curve segments 499, and is used as a first effective operational curve 150 and applied for the control of a wind turbine.

In an embodiment, the controller 36 receives a first condition 310, such as a wind condition, as an input. Based on the wind condition, a first, second and Kth effective operational curve 150, 160, 170 are selected from the plurality of operational curve segments 499, and applied for the control of a first, second, and Kth wind turbine, respectively.

In an embodiment, the controller 36 receives a first condition 310, such as a wind speed, as an input. Based on the value of the wind speed, a first, second and Kth group effective operational curve 151, 161, 171 are selected from the plurality of operational curve segments 499, and applied for the control of a first, second, and Kth group of wind turbines, respectively.

For example, a wind turbine is initially operating according to a first effective operational curve 150 which is selected from the plurality of operational curve segments 499. The wind turbine is initially operating with operational settings that are optimal for low wind speeds, e.g. less than 4 m/s. After determining that the wind speed has increased above a target level, e.g. 4 m/s, the controller 36 selects a different operational curve segment, one that has optimal output (e.g. at least one of power and noise output) at wind speeds between 4 and 8 m/s, making it the effective operational curve. Operational settings are based on the effective operational curve.

An advantage, according to an embodiment described herein, is that the control system provides variable set point power curves and noise curves rather than a single power curve and/or single noise curve. Another advantage, according to an embodiment described herein, is that performance is able to adapt to targets and/or conditions rather than relying on one fixed power curve and one fixed noise curve. For example, since wind speed is a variable condition, the optimal settings of a wind turbine may be different when the wind speed is low in comparison to when the wind speed is higher. The control system provides for variable effective operational curves, describing performance, which may be selected depending on the determination of conditions, and optionally their comparison to targets.

In an embodiment, the controller 36 selects effective settings from a plurality of settings, the settings comprising low-range, mid-range, and high-range settings. For example the wind turbine is initially operating at a low-range setting and the wind speed is low; the controller 36 determines that the wind speed increases to a target, e.g. 4 m/s; in response, the controller 36 selects a mid-range setting from the plurality of mid-range settings and makes it the effective setting. In another example, the controller 36 determines that the wind speed increases to another target, e.g. above 8 m/s; in response, the controller 36 selects a high-range setting from the plurality of high-range settings and makes it the effective setting.

In an embodiment, the selection of the first effective operational curve is based on a dynamic control map (280).

In an embodiment, the controller is adapted to select a first effective operational curve segment from the plurality of operational curve segments 499.

Figure 6:
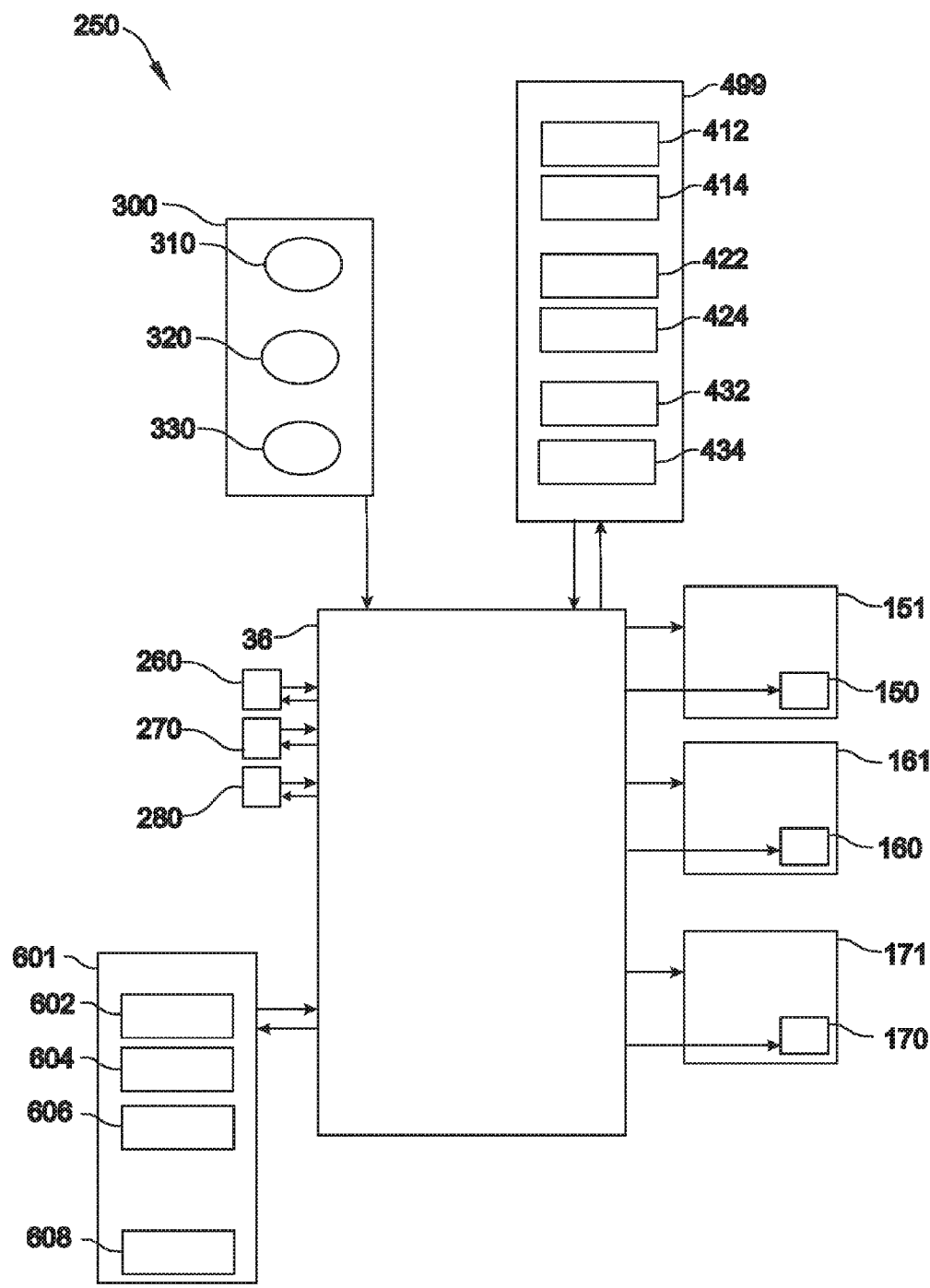
FIG. 6 is a schematic diagram of a control system, according to embodiments described herein.

FIG. 6 illustrates an embodiment of a control system 250. Conditions 300 are received by and optionally calculated by the controller 36. Operational curve segments 499 are combined by the controller 36 to form hybrid operational curves 601. Effective operational curves 150, 160, 170 are selected from hybrid operational curves 601, and applied to the operation of wind turbines; alternatively or additionally, group effective operational curves 151, 161, 171 are selected from hybrid operational curves 601, and applied to the operation of groups of wind turbines. Group configurations 180 are read from and/or written to memory, and wind park configurations 182 are read from and/or written to memory.

In an embodiment, a controller 36 receives conditions 300, for example but not limited to a first condition 310, a second condition 320, and a Jth condition 330. A plurality of operational curve segments 499, for example a total of 2N operational curve segments, are written to and/or read from memory. A plurality of hybrid operational curves 601, for example a total of M hybrid operational curves, are written to and/or read from memory. A plurality of effective operational curves, e.g. a total of K effective operational curves, are selected from the plurality of hybrid operational curves 601, and applied to the operation of a plurality of wind turbines, e.g. K wind turbines. In another embodiment, a total of K group effective operational curves are selected from the plurality of hybrid operational curves 601, and applied to the operation of K groups of wind turbines.

For example, the controller 36 receives conditions 300 of wind speed as a first condition 310, noise output as a second condition 320, and power output as a Jth condition 330.

In an embodiment, the controller 36 may read from memory a first power curve segment 412, first noise curve segment 414, second power curve segment 422, second noise curve segment 424, Nth power curve segment 432, and Nth noise curve segment 434. Hybrid operational curves 601 are combined from operational curve segments 499 by the controller 36, and written to or read from memory. For example, a first, second, third, and Mth hybrid operational curves 602, 604, 606, 608 are written to and read from memory by the controller 36. A first effective operational curve 150 may be selected from the hybrid operational curves 601, and applied to the operation of at least one wind turbine, the first effective operational curve 150 effectively setting the operational settings.

In an embodiment, a plurality of hybrid settings, for example a first, second, third, and Mth hybrid setting are written to and/or stored in memory. Effective settings are selected from the plurality of hybrid settings, and applied to the operation of at least one wind turbine. For example, a total of K effective settings are selected from the plurality of hybrid settings and applied to the operation of K wind turbines. In another example, K effective settings are selected from the plurality of hybrid settings and applied to the operation of K groups of wind turbines.

In an embodiment, the first effective operational curve is a part of a hybrid operational curve comprising at least two operational curve segments. In an embodiment, the hybrid operational curve comprises any one of the low-range operational curve segments and any one of the high-range operational curve segments. Alternatively or additionally, the hybrid operational curve further comprises a mid-range operational curve segment.

Figure 7:
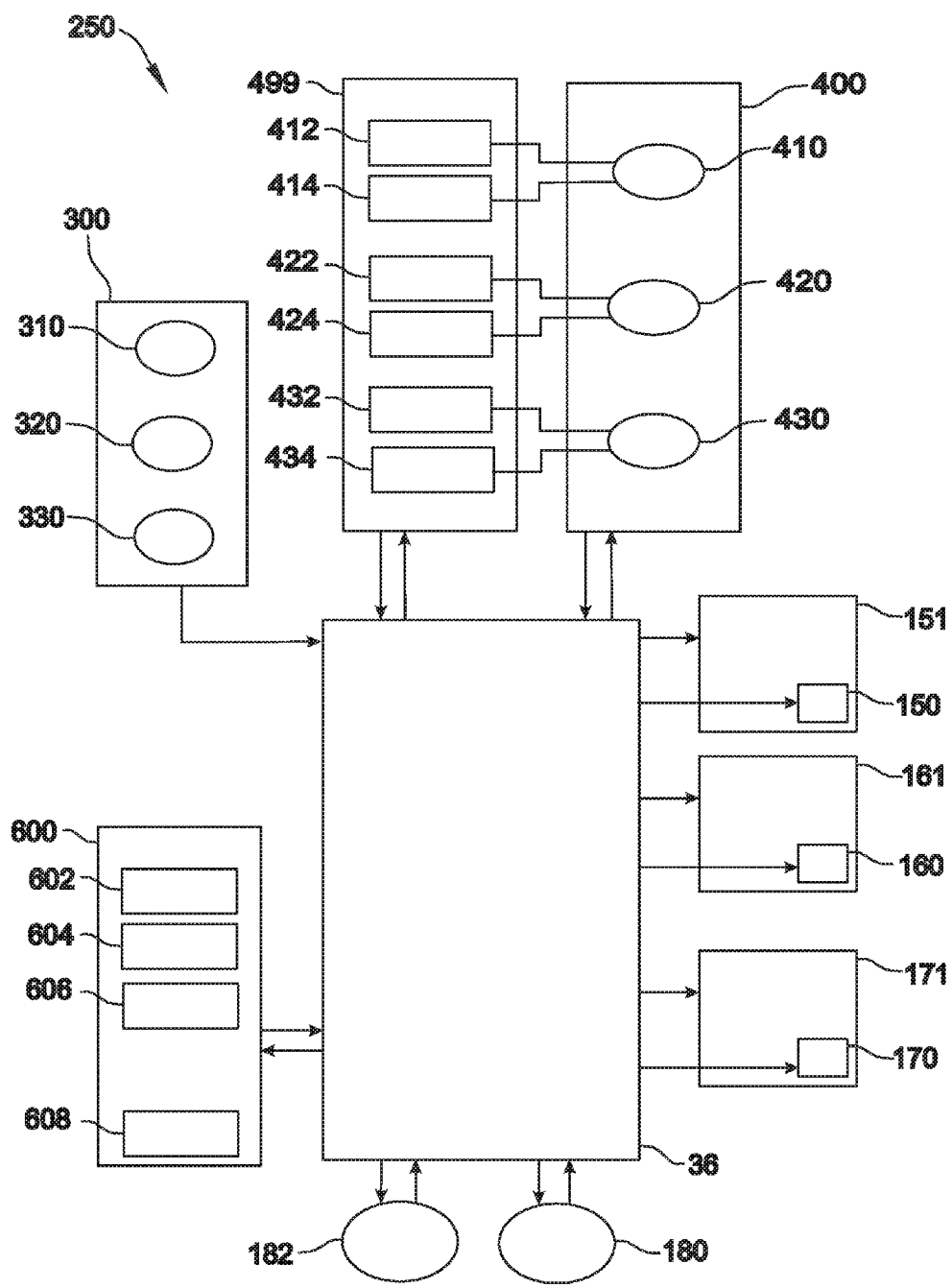
FIG. 7 is a schematic diagram of a control system, according to embodiments described herein.

FIG. 7 illustrates an embodiment of the control system. Operational settings 400 may be associated with each operational curve segment of the plurality of operational curve segments 499, as illustrated in FIG. 7. More than one operational curve segment may be associated with the same operational setting, as illustrated in FIG. 7. For example: the first power curve segment 412 and first noise curve segment 414 are associated with a first operational setting 410; the second power curve segment 422 and second noise curve segment 424 are associated with a second operational setting 420; and the Nth power curve segment 432 and Nth noise curve segment 434 are associated with an Nth operational setting 430.

In an embodiment, by way of example and not limitation, a first operational curve segment is combined with a second operational curve segment to form a first hybrid operational curve 602. The first hybrid operational curve is selected as the first effective operational curve 150 and applied to the operation of at least one wind turbine, the effective operational curve effectively setting the operational settings.

In an embodiment, the controller 36 selects effective settings from a plurality of hybrid settings. A first effective setting is applied to the operation of at least one wind turbine. The first effective setting may be associated with a power curve and/or a noise curve.

In yet another embodiment, the controller 36 combines at least two of the total of 2N operational curve segments 499 to form a second hybrid operational curve 604, and so on to form a plurality, for example to make a total of M, hybrid operational curves. Each operational curve segment may be used more than once to form the plurality of hybrid operational curves.

In an embodiment, from the total of M hybrid operational curves, a plurality of effective operational curves are selected. For example, a first, second, and Kth effective operational curve 150, 160, 170 are selected, and a first, second, and Kth wind turbine generator are controlled by their corresponding first, second, and Kth effective operational settings.

In an embodiment, a first 151, second 161, and Kth 171 group effective operational curves are selected from the plurality of hybrid operational curves (601) and a first, second, and Kth group of wind turbine generators are controlled by the plurality of group effective operational curves.

In an embodiment, the controller 36 selects a first 151, second 161, and Kth 171 effective operational curves or group effective operational curves based on at least one condition of the plurality of conditions 300. For example, the group effective operational curves 151, 161, 171 are selected from the operational curve segments 499 based on wind speed. In another example, the effective operational curves 150, 160, 170 are selected from the operational curve segments 499 based on windspeed.

In an embodiment, the controller 36 selects effective settings from a plurality of hybrid settings. In an embodiment, the controller 36 selects a first through Kth effective setting from the plurality of hybrid settings and applies them, respectively, to the operation of a first through Kth wind turbine. In another embodiment, the controller 36 selects a first through Kth effective setting from the plurality of hybrid settings and applies them, respectively, to the operation of a first through Kth group of wind turbines.

An advantage of the control system, according to an embodiment described herein, is that it provides variable operational settings that enable individual, group, and wind park level control of wind turbines within a wind park.

Because conditions are variable, for example not only the daily average windspeed of an entire wind park but also wind speed at different locations within a wind park, the optimal settings for a wind turbine at one location may be different than the optimal setting at another location. The control system provides for spatial and dynamic operational control of wind turbine operational performance and settings. For example, this allows for optimization of energy capture while staying below noise targets at critical locations by adapting to, for example, spatial wind characteristics across the wind park, e.g. minimizing wake loss effects and/or meeting or staying just below noise targets, which may be spatially dependent.

Figure 8:
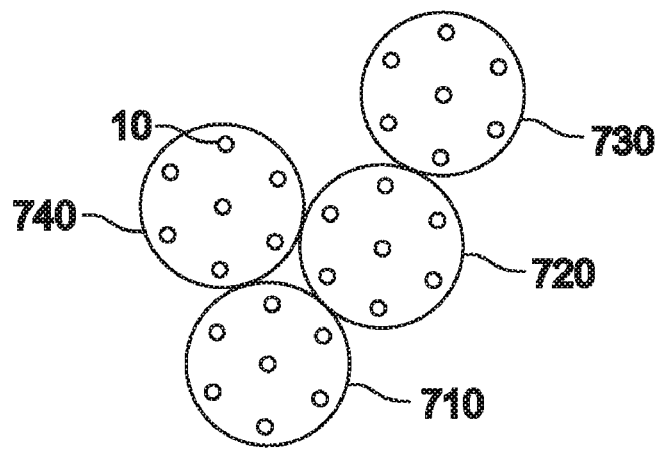
FIG. 8 is a representation of a wind park with four groups of wind turbines, according to embodiments described herein.

FIG. 8 illustrates, according to embodiments described herein, a wind park in which a plurality of wind turbines 10 is configured in groups: a first group 710, a second group 720, a third group 730, and an Nth group 740. The wind park configuration initially may be based on initial wind park development assessment and simulations. Wind park configuration may be variable. Configuration of at least two wind turbines in a wind park is possible by assigning them to at least a first group and a second group. A configuration may be reconfigured into a different (or identical) configuration. In another example, the groups of wind park of FIG. 8 are configured into exactly two groups, group A including the first and second groups 710, 720, and group B including the third and Nth groups 730, 740.

Wind park configurations may be organized according to wind turbine topology and possible spatial distributions of wind field conditions. In an embodiment, the selection of a wind park configuration is based on wind turbine topology and the actual and/or expected spatial distribution of at least one wind field condition, for example the spatial distribution of wind speed.

In an embodiment, the controller 36 combines operational curve segments to form a plurality of hybrid operational curves. A first effective operational curve, a second effective operational curve, a third effective operational curve, and an Nth effective operational curve are selected from the plurality of hybrid operational curves. The controller 36 adjusts the operation of the first group of wind turbines based on at least partially the first effective operational curve, and adjusts the operation of the second group of wind turbines based on at least partially the second effective operational curve, and so on. For example, the first and second effective operational curves are applied to the operation of the first and second groups of wind turbines, respectively, the respective first and second effective operational curves effectively setting the respective operational settings.

The selection of effective operational curves, and the associated adjustment of the operation of individual wind turbines and/or groups of wind turbines based on at least partially the effective operational curves, may, for example, take into account one or more of the following: a windpark configuration, a dynamic control map overlay, and conditions.

For example, a light southeasterly wind is present on a wind park with a configuration of wind turbines as depicted in FIG. 8 (north is toward the top of the figure). To maximize power output while simultaneously meeting or coming just below a noise target, the wind turbine operation of the first through Nth groups of wind turbines is controlled by the selection of a total of N group effective operational curves from the plurality of hybrid operational curves. The group operational settings and optionally group operational curves of groups 1 and 2 are based on the second effective operational curve 690, reducing the noise output of groups 1 and 2 and simultaneously the power output of those groups, in comparison to the standard operational curve 699. Simultaneously, the group operational setting and optionally group effective curve of the third and Nth groups are based on the first hybrid operational curve 680, so the effective operational curves of all wind turbines within groups 3 and N describe greater power output and greater noise output in comparison to the wind turbines of groups 1 and 2 (at a given wind speed assuming the wind speed is the same for all groups). Alternatively or additionally, the effective settings and optionally operational curves applied to groups 1 to N may be the same as described above, but selected due to the existence of different conditions, for example, a strongly negative wind speed gradient from one end of the wind park to the opposite. Because in this example the determination of a wind speed gradient is done by measuring wind speed at multiple locations, conditions measured at multiple locations may impact the selection of effective operational curves.

In another example, a strong southwesterly wind is present on a windpark with a configuration of wind turbines as depicted in FIG. 8 (north is toward the top of the figure). To maximize power output while simultaneously meeting hard noise limits, a total of N effective group operational curves are selected for the first through Nth groups. The second effective operational curve 690 and the first effective operational curve 680 are selected, respectively, for the first and third groups; and a third effective operational curve with somewhat higher output compared to the second effective operational curve 690 is selected for the second group, and a fourth effective operational curve with somewhat lower output compared to the first effective operational curve 680 is selected for the Nth group, with the third effective operational curve having a lower output generally in comparison to the fourth effective operational curve. In another example pertaining to the same wind field conditions as described above, a first, second, third, and fourth effective setting are chosen from a plurality of hybrid settings and applied to the operation of the groups of wind turbines.

An advantage of the control system, according to an embodiment described herein, is that it provides flexible individual and group settings of wind turbines spatially distributed within a wind park to account for variable conditions and the desirability of maximizing energy capture and staying below or meeting noise limits. The control system may account for spatially variable wind, noise limits, and wake loss effects. For example, a first group of wind turbines within a wind park may be located close to a neighborhood which has an allowable noise target that is lower than that of wind turbines at other locations. Optimal operational settings of the wind park will take into account that quieter noise output curves are to be selected as effective operational curves for the control of the first group, which may negatively impact their energy capture; effective operational curves may be selected for other groups that more efficiently capture energy due to relaxed noise limits at locations farther from the neighborhood of stringent noise limits. An advantage of the control system, according to an embodiment described herein, is that it ensures compliance with environmental regulation, for example regarding hard noise limits. Another advantage, according to an embodiment described herein, is that the control system simultaneously ensures compliance with environmental regulation while increasing or maximizing energy capture.

In an embodiment, a dynamic control map overlay adjusts group and/or individual wind turbine settings based on effective operational curves and/or effective settings that are selected dynamically based on conditions. The time scale of changes to group and/or individual wind turbine operational settings due to the dynamic control map overlay are, for example, from hours to days to months to seasons to years. For example, a daily control map overlay is applied to an initial wind park configuration once per day that changes at least one of the effective operational curves and/or settings each day. The daily control map overlay changes group or individual wind turbine effective operational curves and/or settings based on the geometric distribution of wind turbines, and at least partially daily variations of conditions, for example at least one of: wind direction, overall speed, spatial speed gradient, overall air density, spatial air density gradient, etc. Other examples of dynamic control map overlays are hourly, seasonal and annual dynamic control map overlays.

In another embodiment, effective group operational curves and/or settings and wind park configuration is subject to a yearly control map overlay which is computed based on wind daily characteristics (for example but not limitation yearly seasonal wind rose, yearly seasonal speed and yearly seasonal spatial distribution).

For example, yearly averaged wind speed decreases, for example from 8.5 m/s to 7.5 m/s from one year to another. Implementation of a yearly control map causes at least one of the effective operational curves to be revised to an effective operational curve with a higher general power output curve. Conditions of noise output and power output are determined at the revised setting(s), and compared with a noise limit map overlay to ensure that hard noise limits at critical locations are met or not exceeded. An estimate of energy capture is also made which facilitates comparison of power outputs of the previous and revised effective operational curves and/or their associated settings.

An advantage of the control system, according to an embodiment described herein, is that it provides a way to compensate for low wind years. An advantage of the control system, according to an embodiment described herein, is that it provides a way to maximize energy capture on both daily and yearly time scales while meeting or remaining below noise limits. An advantage of the control system, according to an embodiment described herein, is that it provides a way to dynamically increase or maximize energy capture as met noise limits undergo dynamic changes.

In an embodiment, group effective operational curves are selected based on wind park configuration, wind turbine topology, spatial distribution of wind field characteristics, and time. At least two optimization routines, one with a short integration time constant of approximately an hour and the other with a long integration time constant of approximately a year, are implemented, to adapt the wind park's effective operational curves to conditions such as wind direction, speed, and spatial distribution.

In an embodiment, the controller 36 calculates an estimate of gain of annual energy production (gain of AEP) by comparing estimates of annual energy production (AEP) at a given wind park configuration to the standard AEP of a standard configuration of wind turbines (all operating according to standard operational curves). In an embodiment, the gain of AEP at different configurations can be compared to each other and used to select a configuration with a higher gain of AEP. In an embodiment, a configuration may be selected with reference to gain of AEP and to hard noise limits, to ensure that a configuration is selected that has a relatively high gain of AEP while simultaneously meeting hard noise limits. In an embodiment, estimated energy capture may be substituted for gain of AEP.

An advantage of the control system, according to an embodiment described herein, is that it provides a way to maximize gain of AEP on various time scales, for example, from hourly to daily to monthly, seasonally, and yearly, while maintaining noise output levels below or at limits.

In an embodiment, under a configuration of wind turbines, the controller 36 calculates a first estimated gain of AEP. The controller 36 adjusts the operation of at least one wind turbine based on at least partially the first effective operational curve, forming a second configuration of wind turbines. The controller 36 calculates a second estimated gain of AEP. By selecting between the first and second configurations, the one with greater gain, the gain is maximized with respect to the two compared configurations. By iteratively adjusting the operation of wind turbines or groups of wind turbines according to different operational curves, e.g. power curves, different estimates of gains of AEP may be made for different combinations of effective operational curves applied to wind turbines throughout the wind park. AEP is maximized by recording the effective operational curves, and their respective assignments to wind turbines within the wind park, that result in the maximum gain. As the iterative adjustment of wind turbine operation is carried out, noise may be determined, and used to ensure that hard noise limits are met. An advantage according to an embodiment described herein, is that a way to maximize gain of AEP is provided, and it may account for hard noise limits. By iteratively applying different effective operational curves to wind turbines or groups of wind turbines, and measuring and recording power and noise with at least one calibrated microphone after each iteration, a configuration is found that maximizes AEP while operating at just less than the hard noise limit, within acceptable error.

In an embodiment, wind turbine self-calibration is performed. For example, wind turbine self-calibration is performed to avoid mismatch between (1) wind park development simulations and targets, and (2) real operations and resulting performances. Self-calibration may also be carried out to suppress variation of wind turbine operating characteristics. Self-calibration may be performed to improve the accuracy between arbitrary operational curves and their associated operational settings, for example the accuracy of standard operational curves as associated with standard operational settings for a given wind turbine.

In an embodiment, self calibration involves the measurement and/or calculation of an arbitrary operational curve. At least two conditions are measured and recorded at an arbitrary unit setting (e.g. the standard setting). For example, wind-speed is measured with an anemometer and noise is measured with a calibrated microphone. The anemometer, for example, may be located either up- or down-stream from the wind turbine; and there may be more than one anemometer with for example, one located upstream and another downstream of the wind turbine. The calibrated microphone may be, for example, located in the foundation system of the wind turbine or integrated into the tower; and there may be more than one calibrated microphone at different locations.

An arbitrary operational curve, of noise versus wind speed, is typically calculated and stored in memory. On the basis of the arbitrary operational curve (e.g. the standard noise curve) and its associated operational settings (e.g. the standard settings), other operational curves (in this example, of noise versus wind speed) can be calculated and associated with their operational settings. An arbitrary operational curve that describes power output versus wind speed can be measured and calculated similarly to the arbitrary noise curve described above, by measuring power output and wind speed at an arbitrary operational setting.

An advantage of self-calibration, in an embodiment, is that it provides a way to adjust the wind turbine settings to account for drift in performance. Another advantage of self-calibration, in an embodiment, is that it provides a way to adjust the wind turbine settings to account for variability in as-installed performance. For example, upon initial installation of a wind turbine, the standard settings are expected to result in the standard operational curves. However, due to variation between as-installed wind turbines, there is some difference between as-installed operational curves and the standard settings. Self-calibration allows the standard settings to be adjusted to make up the difference between the expected standard operational curve and the as-installed operational curves. In another example, some drift of performance has occurred over the lifetime of a wind turbine, resulting in a mismatch between actual operational curves and standard operational curves, at the standard settings. Self-calibration allows the standard settings to be adjusted to make up the difference between the standard operational curve and the actual operational curves.

In an embodiment, anomaly detection is performed by comparing measured outputs and expected outputs, or comparing operational curves and expected operational curves. Anomaly detection detects possibly significant anomalies such as those that impact the power curve for example due to blade icing, or those that impact the noise curve for example due to surface damage to the blade. The anomaly detection may trigger operator warning for inspection. Anomaly detection may also affect unit settings by compensating for operational drift.

Figure 9:
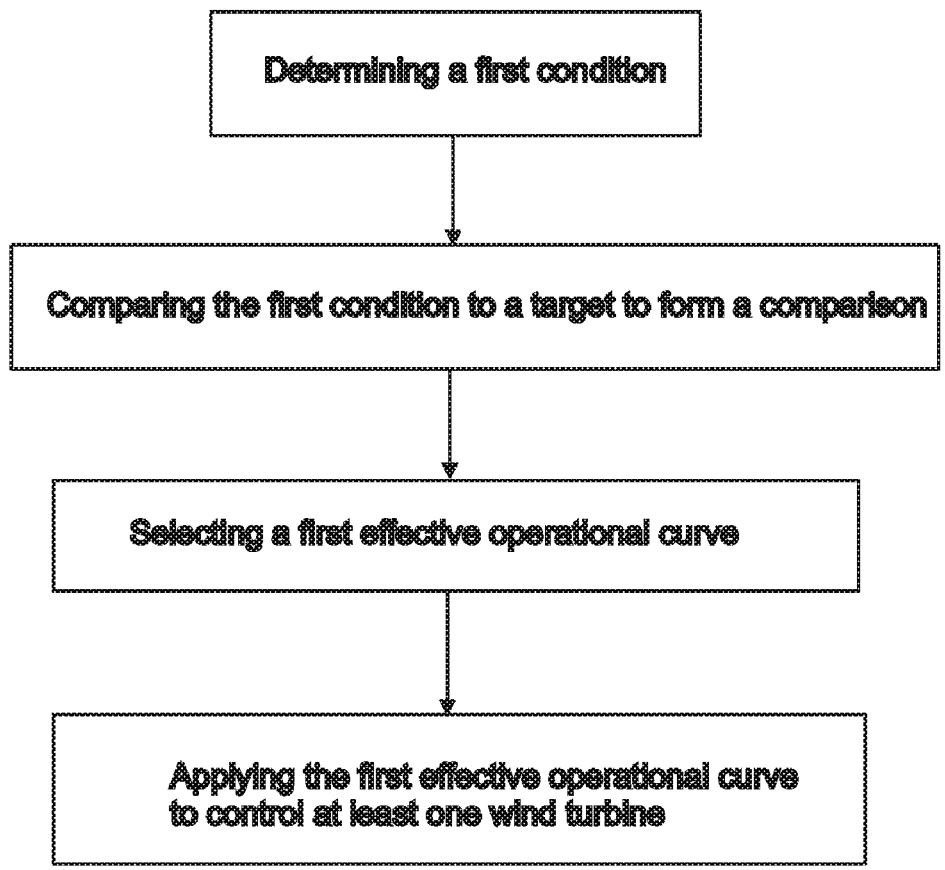
FIG. 9 is a schematic of a method of controlling at least one wind turbine, according to embodiments described herein.

FIG. 9 is a schematic of a method of controlling at least one wind turbine. In an embodiment, a first condition, for example a noise, is determined, and compared to a target to form a comparison. Based on the comparison a first effective operational curve is selected, and it is applied to the control of at least one wind turbine. Alternatively or additionally, the selection of the first effective operational curve is based on a dynamic control map. Alternatively or additionally, a second effective operational curve is selected and applied to the operation of at least one other wind turbine. Alternatively or additionally, the effective operational curves may be selected from a plurality of operational curves. Alternatively or additionally, effective operational curves may be selected from a plurality of hybrid operational curves. Alternatively or additionally, a second effective operational curve is selected and applied to the control of at least one other wind turbine.

The above-described systems and methods facilitate compensation for at least one of: insufficiently low wind resource production periods, excessively high wind resource production periods, and hard noise limits. At least one embodiment of the above-described systems and methods facilitates adaptable user targets to maximize AEP while meeting hard noise limits. At least one embodiment of the above-described systems and methods facilitates the implementation of multiple operational curves instead of one fixed power curve and noise curve. At least one embodiment of the above-described systems and methods facilitates variable operational settings that enable the adaptation of specific wind park layout to specific wind characteristics on variable time scales to maximize estimated AEP on variable time scales within wind turbine allowable margins, e.g. hard noise limits.

At least one embodiment of the above-described systems and methods facilitates wind park customization beyond traditional physical layout where wind turbines can be operated with specific group settings in order to adapt to specific spatial wind characteristics to, for example, maximize AEP at wind park level while minimizing wake effect loss and meeting hard noise limits at critical locations.

At least one embodiment of the above-described systems and methods facilitates a customization routine to show gained AEP based on wind park configuration, wind turbine groups, and/or individual wind turbine with reference to a traditional fixed configuration where all wind turbines operate on a single fixed power curve and single associated noise curve.

At least one embodiment of the above-described systems and methods facilitates wind turbine self calibration and anomaly detection to enable detection of possibly significant anomalies that may be compensated by adjusting the selected effective operational curves and/or may be used to notify a user, or operator.

At least one embodiment of the above-described systems and methods facilitates adaptive wind park and wind turbine control systems that increase estimated AEP on an approximately hourly, daily, seasonally, and up to approximately yearly basis, while optionally meeting hard-noise limits.

At least one embodiment of the above-described systems and methods, for example those describing self-calibration and anomaly detection, facilitates reliable wind turbine nominal operations, compensates for potential drift, and detects performance defects that significantly impact output such as, for example, power and noise.

An advantage of the above-described systems and methods, according to at least one embodiment described herein, is to protect the wind turbine during stormy days.

Exemplary embodiments of systems and methods for controlling wind turbines are described above in detail. The systems and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling at least one wind turbine, comprising:
    providing a plurality of operational curves;
    determining a first condition;
    comparing the first condition to a target to form a comparison;
    selecting a first effective operational curve from a plurality of operational curves, wherein selecting the first effective operational curve is based on the comparison; and,
    applying the first effective operational curve to control at least one wind turbine.

2. The method of claim 1, wherein
selecting the first effective operational curve is based on a dynamic control map.

3. The method of claim 1, further comprising:
selecting a second effective operational curve from the plurality of operational curves; and,
applying the second effective operational curve to control at least one other wind turbine.

4. The method of claim 1, further comprising:
selecting a second effective operational curve from the plurality of operational curves; and,
applying the second effective operational curve to control at least one other wind turbine; wherein,
selecting the second effective operational curve is based on the comparison.

5. The method of claim 4, further comprising:
determining a second condition;
comparing the second condition to a second target to form a second comparison;
wherein,
selecting the second effective operational curve is based on the second comparison.

6. The method of claim 1, wherein
the plurality of operational curves comprise
a plurality of low-range operational curve segments defined for a low range of conditions,
a plurality of high-range operational curve segments defined for a high range of conditions, and
a plurality of hybrid operational curves; wherein,
each of the hybrid operational curves comprises any one of the low-range operational curve segments and any one of the high-range operational curve segments; and, wherein,
the first effective operational curve is selected from the plurality of hybrid operational curves.

7. The method of claim 1, wherein
the first condition is selected from the group consisting of: wind speed, tip speed ratio, noise, power, rotor speed, generator performance, pitch angle, pitch rate, wind velocity, wind direction, wind speed gradient, air density, air density gradient, seasonal wind rose, seasonal wind speed, seasonal spatial distribution of wind, yearly windrose, yearly wind speed, yearly spatial distribution of wind, temperature, estimate of energy capture, and estimate of gain of annual energy production.

8. A method of controlling at least one wind turbine, comprising:
providing a plurality of operational curve segments;
forming a plurality of hybrid operational curves by combining operational curve segments from the plurality of operational curve segments;
selecting a first effective operational curve from the plurality of hybrid operational curves; and,
applying the first effective operational curve to control at least one wind turbine.

9. The method of claim 8, wherein
the plurality of operational curve segments comprise
a plurality of low-range operational curve segments defined for a low range of first conditions, and
a plurality of high-range operational curve segments defined for a high range of first conditions; and,
each of the hybrid operational curves comprises any one of the low-range operational curve segments and any one of the high-range operational curve segments.

10. The method of claim 9, wherein
the plurality of operational curve segments further comprise
a plurality of mid-range operational curve segments defined for a medium range of first conditions; and,
each of the hybrid operational curves further comprises any one of the mid-range operational curve segments.

11. The method of claim 9, wherein
the first conditions are wind speeds.

12. The method of claim 8, further comprising:
determining a second condition;
comparing the second condition to a target to form a comparison; wherein, selecting the first effective operational curve is based on the comparison.

13. The method of claim 12, wherein
the second condition is selected from the group consisting of: wind speed, tip speed ratio, noise, power, rotor speed, generator performance, pitch angle, pitch rate, wind velocity, wind direction, wind speed gradient, air density, air density gradient, seasonal wind rose, seasonal wind speed, seasonal spatial distribution of wind, yearly windrose, yearly wind speed, yearly spatial distribution of wind, temperature, estimated gain of annual energy production, estimate of energy capture, estimate of energy output, and estimate of gain of annual energy production.

14. The method of claim 12, wherein
the second condition is either noise or power, and
the target is either a hard noise limit or an estimate of energy output.

15. The method of claim 8, further comprising:
selecting a second effective operational curve from the plurality of hybrid operational curves; and,
applying the second effective operational curve to control at least one other wind turbine.

16. A control system for controlling at least one wind turbine, comprising
a controller, and
a memory for storing a plurality of operational curve segments;
wherein, the controller is adapted to select a first effective operational curve segment from the plurality of operational curve segments, and is adapted to apply the first effective operational curve segment to the control of at least one wind turbine.

17. The control system of claim 16, further comprising
a sensor adapted to determine a first condition; and,
wherein the controller is adapted to compare the first condition to a target to form a comparison; and, wherein, the controller is adapted to select the first effective operational curve segment based on the comparison.

18. The control system of claim 16, wherein
the plurality of operational curve segments comprises a plurality of low-range operational curve segments defined for a low range of conditions; and
the plurality of operational curve segments further comprises
a plurality of high-range operational curve segments defined for a high range of conditions.

19. The control system of claim 18, wherein
the first effective operational curve segment is a part of a hybrid operational curve comprising at least two operational curve segments.

20. The control system of claim 19, wherein
the hybrid operational curve comprises any one of the low-range operational curve segments and any one of the high-range operational curve segments.

* * * * *